(12) United States Patent
Paul et al.

(10) Patent No.: US 12,182,756 B2
(45) Date of Patent: Dec. 31, 2024

(54) FLEET MANAGEMENT WITH ADAPTIVE STOP DETECTION RADIUS

(71) Applicant: Oracle International Corporation, Redwood Shores, CA (US)

(72) Inventors: Rahul Paul, Karnataka (IN); Sourath Roy, Karnataka (IN); Bharath T. S., Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 383 days.

(21) Appl. No.: 17/728,109

(22) Filed: Apr. 25, 2022

(65) Prior Publication Data

US 2023/0188927 A1 Jun. 15, 2023

(30) Foreign Application Priority Data

Dec. 9, 2021 (IN) .............................. 202141057201

(51) Int. Cl.
| | |
|---|---|
| H04W 4/021 | (2018.01) |
| G06Q 10/083 | (2023.01) |
| G06Q 10/0833 | (2023.01) |
| G07C 5/00 | (2006.01) |
| G16Y 40/60 | (2020.01) |
| H04W 4/38 | (2018.01) |

(52) U.S. Cl.
CPC ..... *G06Q 10/0833* (2013.01); *G06Q 10/0838* (2013.01); *G07C 5/008* (2013.01); *G16Y 40/60* (2020.01); *H04W 4/021* (2013.01); *H04W 4/38* (2018.02)

(58) Field of Classification Search
CPC .......... G06Q 10/0833; G06Q 10/0838; G16Y 40/60; H04W 4/021; H04W 4/38; G07C 5/008

USPC ......................................................... 701/482
See application file for complete search history.

(56) References Cited

U.S. PATENT DOCUMENTS

| | | | |
|---|---|---|---|
| 7,755,541 B2 | 7/2010 | Wisherd et al. | |
| 10,382,294 B2 | 8/2019 | Bali et al. | |
| 10,421,437 B1 * | 9/2019 | Koskan | .............. G08B 21/0261 |
| 10,863,302 B2 * | 12/2020 | Gonzalez | .............. H04W 4/021 |
| 10,957,204 B1 | 3/2021 | Kumar et al. | |

(Continued)

FOREIGN PATENT DOCUMENTS

| | | |
|---|---|---|
| CN | 104866999 A | 8/2015 |
| CN | 107622364 A | 1/2018 |
| WO | 2019075138 A1 | 4/2019 |

OTHER PUBLICATIONS

Unknown, "How it Works", SenseAware, https://www.senseaware.com, last downloaded on Oct. 30, 2020.

(Continued)

*Primary Examiner* — Andrew Joseph Rudy
(74) *Attorney, Agent, or Firm* — Potomac Law Group, PLLC

(57) ABSTRACT

Embodiments detect stops by an entity on a pre-planned trip that includes a plurality of stops. For each stop of the plurality of stops, embodiments determine a distance to a nearest stop and generate a geofence for each of the stops, each geofence having a radius having a size based on the distance. Embodiments detect the entity entering one of the geofences and, based on the detecting the entity entering one of the geofences, determine that the entity has stopped at a corresponding stop.

20 Claims, 7 Drawing Sheets

(56) References Cited

U.S. PATENT DOCUMENTS

| | | | |
|---|---|---|---|
| 11,830,366 B2* | 11/2023 | Ren | G05D 1/0214 |
| 2004/0243664 A1 | 12/2004 | Horstemeyer | |
| 2010/0007500 A1 | 1/2010 | Mestres et al. | |
| 2011/0050397 A1* | 3/2011 | Cova | G06Q 10/08 340/10.1 |
| 2013/0147617 A1 | 6/2013 | Boling et al. | |
| 2013/0225282 A1 | 8/2013 | Williams et al. | |
| 2016/0232483 A1 | 8/2016 | London et al. | |
| 2016/0379165 A1 | 12/2016 | Moakley | |
| 2017/0127249 A1 | 5/2017 | Li et al. | |
| 2018/0081374 A1 | 3/2018 | Nimchuk et al. | |
| 2018/0158020 A1 | 6/2018 | Khasis | |
| 2018/0288566 A1 | 10/2018 | Lu | |
| 2020/0064865 A1 | 2/2020 | Lei et al. | |
| 2021/0293555 A1 | 9/2021 | Roherty et al. | |
| 2021/0302979 A1 | 9/2021 | McAlpine et al. | |
| 2022/0046381 A1 | 2/2022 | Ong et al. | |
| 2022/0132274 A1 | 4/2022 | S et al. | |
| 2023/0147126 A1 | 5/2023 | Iwamoto et al. | |
| 2023/0186230 A1* | 6/2023 | Paul | G06Q 10/0838 705/333 |
| 2023/0188941 A1 | 6/2023 | Palop et al. | |
| 2023/0336940 A1* | 10/2023 | Yim | H04W 4/021 |
| 2024/0166076 A1 | 5/2024 | Rosenblatt et al. | |

OTHER PUBLICATIONS

Unknown, "Managed Solution for High-Value Asset and fleet Tracking", https://www.sierrawireless.com/products-and-solutions/sims-connectivity-and-cloud-services/managed-iot-solutions/asset-tracking/ 1/, last downloaded on Oct. 30, 2020.

Unknown, "SenseAware is FedEx's IoT response to supply chain optimization", htpps://www.rcrwireless.com/20160929/big-data-anlytics/fedex-iot-tag31, last downloaded on Oct. 30, 2020.

Unknown, "What is SenseAware?", www.senseaware.com, last downloaded on Oct. 30, 2020.

Unknown, Domo IoT Asset Tracking, https://webcache.googleusercontent.com/search?q=cache:A9f7PEUpR_gJ:https://aws.amazon.com/iot/solutions/DomoVerizon/+&cd=1&hl=en&ct=clnk&gl=us, last downloaded on Oct. 30, 2020.

Reclus et al., "Geofencing for Fleet and Freight Management", IIEE Xplore, pp. 353-354, 2009.

* cited by examiner

FLEET MANAGEMENT WITH ADAPTIVE STOP DETECTION RADIUS

One embodiment is directed generally to a computer system, and in particular to fleet management using a computer system.

BACKGROUND INFORMATION

Large quantities of cargo are transported daily across the continental US and in most other industrial countries using transportation carriers. The use of tractor-trailers as cargo transport vehicles provided by the trucking industry accounts for a significant portion of the vehicles utilized to transport cargo, typically in the form of a "fleet" of trucks. In the trucking industry, cargo is arranged to be transported from an origination point to a destination point via a particular tractor-trailer, driven by an operator/driver.

Remotely monitoring all items associated with a trip is necessary to track inventories and progress in the transport. Specifically, there is a need for real-time end-to-end transportation visibility and insights into business entities, such as vehicle location, condition of containers, status of in-transit inventory, cargo condition, operational costs, vehicle use, and driving behavior.

SUMMARY

Embodiments detect stops by an entity on a pre-planned trip that includes a plurality of stops. For each stop of the plurality of stops, embodiments determine a distance to a nearest stop and generate a geofence for each of the stops, each geofence having a radius having a size based on the distance. Embodiments detect the entity entering one of the geofences and, based on the detecting the entity entering one of the geofences, determine that the entity has stopped at a corresponding stop.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment is a fleet management/monitoring system that determines an adaptive stop geofence radius for one or more stops of a planned trip. The radius is used to detect an arrival and departure from the corresponding stop. The adaptive radius ensures that the radius of two or more stops for the planned trip do not overlap.

In a fleet monitoring system, arrival and departure detection for a stop is generally based on a stop detection radius (i.e., a geofence, or a virtual perimeter for a real-world geographic area). At any point during the execution of the planned trip, if the latest known location of the trip falls anywhere within the stop detection radius of the stop, the trip is determined to have arrived at the stop. Following the arrival detection for a stop, when the last known location of the trip falls outside the stop detection radius of this stop, the trip has determined to have departed from the stop. However, there is a need for the detection radius of the stop to be adaptive, particularly when the stops of a trip are in close vicinity.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
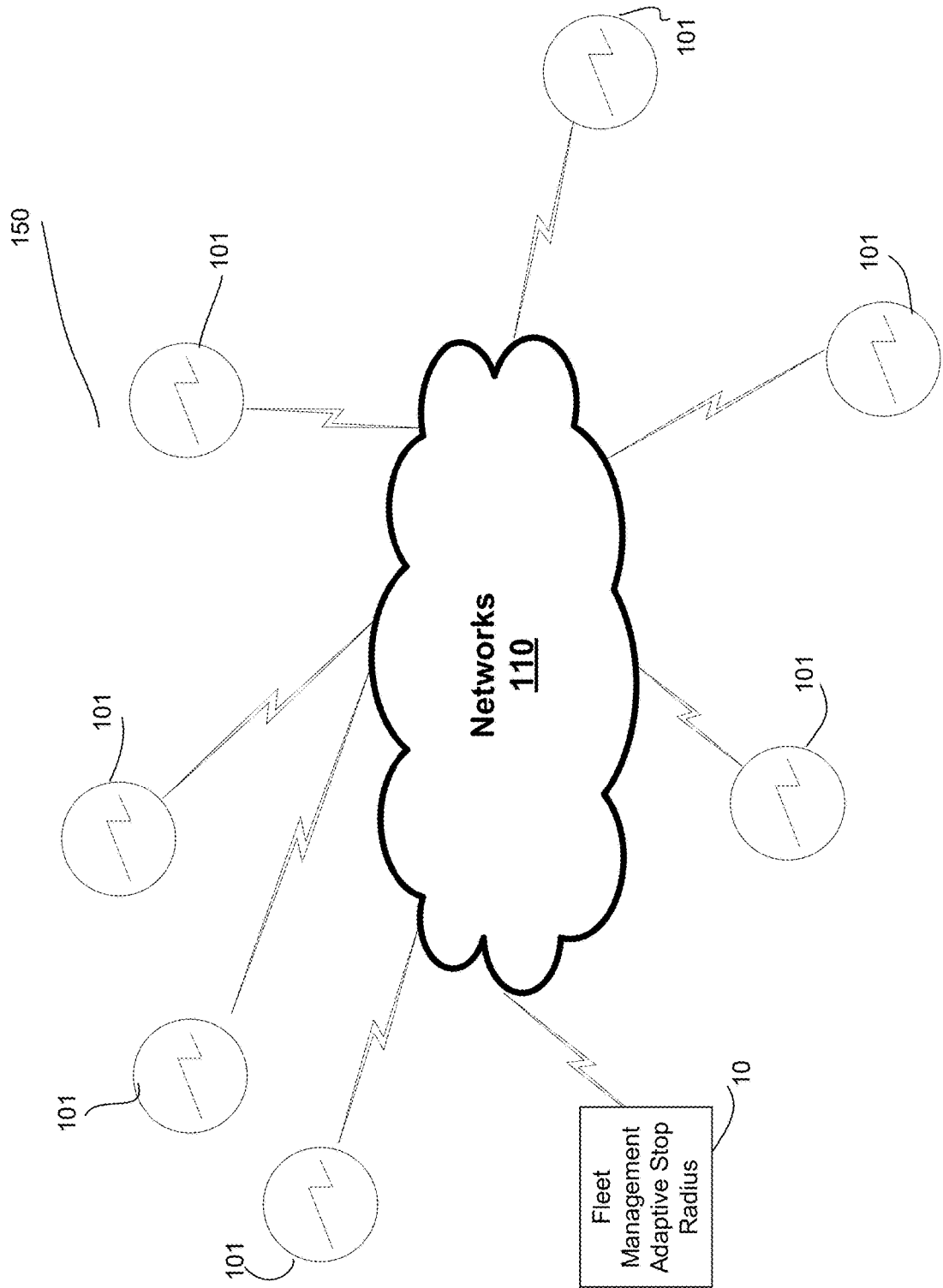
FIG. 1 is an overview diagram of elements of a fleet management adaptive stop radius network/system that can implement embodiments of the invention.

FIG. 1 is an overview diagram of elements of a fleet management adaptive stop radius network/system 150 that can implement embodiments of the invention. Network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101. For example, for a fleet of "trucks" that are being monitored, each portion of the truck may include a sensor (e.g., the actual truck body and the one or more trailers that are being pulled by the truck, and each item that is loaded into each of the trailers).

An IoT device can be any device that has a sensor attached to it and can transmit data from one object to another or to people with the help of Internet. IoT devices include wireless sensors, software, actuators, and computer devices. They are attached to a particular object that operates through the Internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. Each of sensors 101 communicate, wirelessly or wired, through one or more networks 110. Networks 110 include the Internet, but may also include private on-premise networks that ultimately interface with the Internet as well as any other type of network that allows sensors 101 to communicate.

A fleet management adaptive stop radius server 10 is coupled to networks 110 to send and receive data from sensors 101. Fleet management adaptive stop radius 10 provides the fleet item management adaptive stop radius functionality disclosed herein. In general, fleet management adaptive stop radius 10 monitors data acquired by each of sensors 101 for purposes of automatically adapting the radius of stops of a pre-planned trip based on the distance between the stops.

Figure 2:
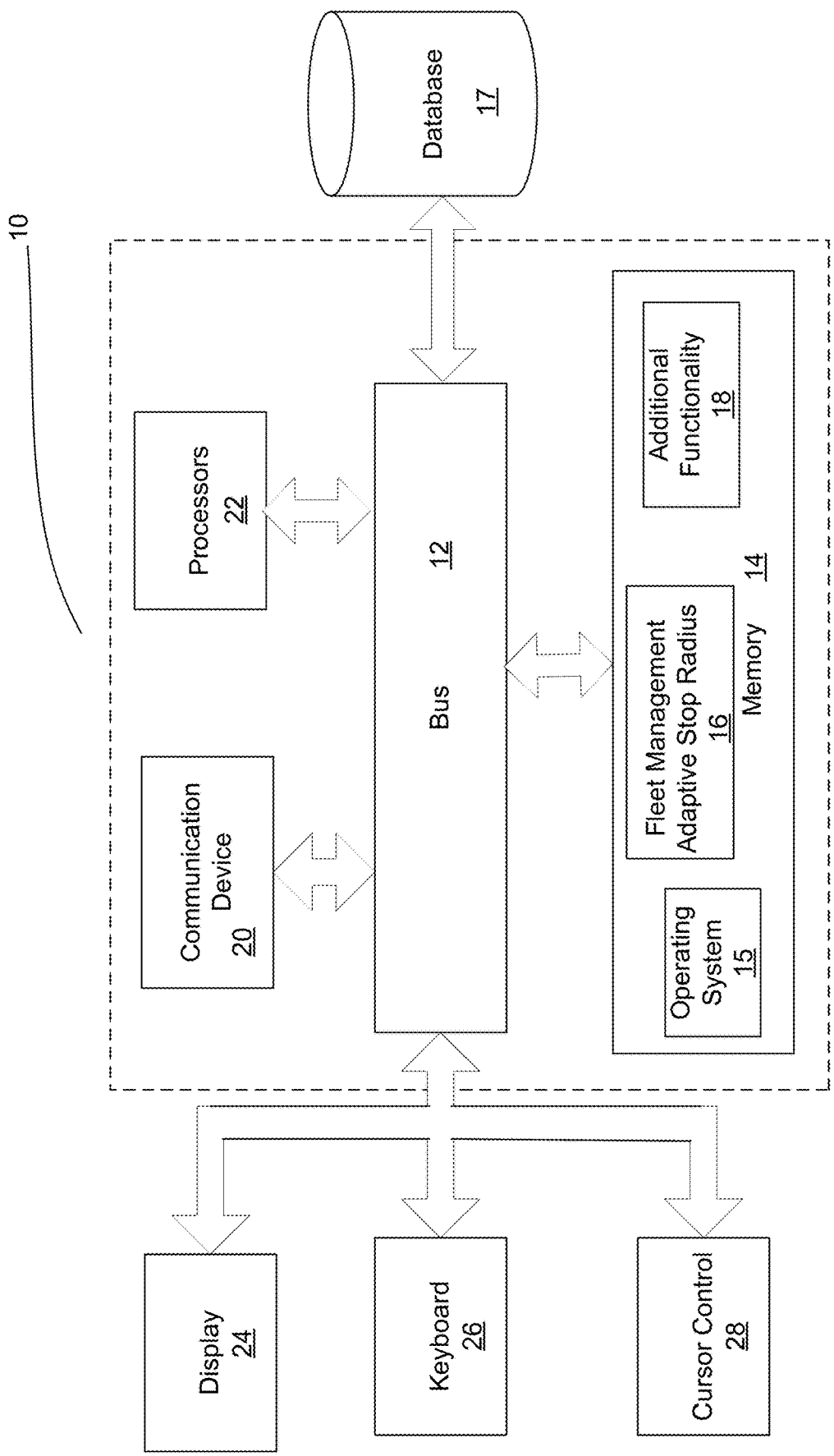
FIG. 2 is a block diagram of the fleet management adaptive stop radius of FIG. 1 in the form of a computer server/system in accordance with an embodiment of the present invention.

FIG. 2 is a block diagram of fleet management adaptive stop radius 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a fleet management adaptive stop radius module 16 that automatically adapts the geofence radius of each stop for a pre-planned trip, and all other functionality disclosed herein. System 10 can be part of a larger system. Therefore, system 10 can include one or more additional functional modules 18 to include the additional functionality, such as the "IoT Asset Monitoring Cloud Service" or "IoT Fleet Monitoring Cloud" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

In general, an IoT Fleet Monitoring system such as "IoT Fleet Monitoring Cloud" from Oracle Corp. requires that when a trip is being executed, it should be capable of detecting the actual arrival at, and departure from, planned stops of a trip and record the timestamp of these events. During the execution of the trip, the real time location information of the route traversed is captured by using geo-coordinate sensors continuously at a certain periodicity. These recorded geo-coordinates will be sent to a server monitoring the trip and performing stop arrival and departure detection. This would be the minimal set of requirements for any software to track the location of the trip. With this minimal requirement, the following method is a known solution for detecting the arrival and departure at the stops.

Each planned stop in the trip will have a pair of latitude and longitude sets of geo-coordinates. For each stop, with the geo-coordinates of the stop location as the center, a stop detection radius is determined. This radius could be user defined or a hardwired default used by the trip monitoring component. At any point during the execution of the trip, if the recent known geo-location of the trip falls anywhere within the stop detection radius of the stop, then the arrival at the stop is recorded. Following the arrival detection at a stop, when the last known geo-location of the trip falls outside the stop detection radius of this stop, the trip is considered to have departed from that stop.

Figure 3:
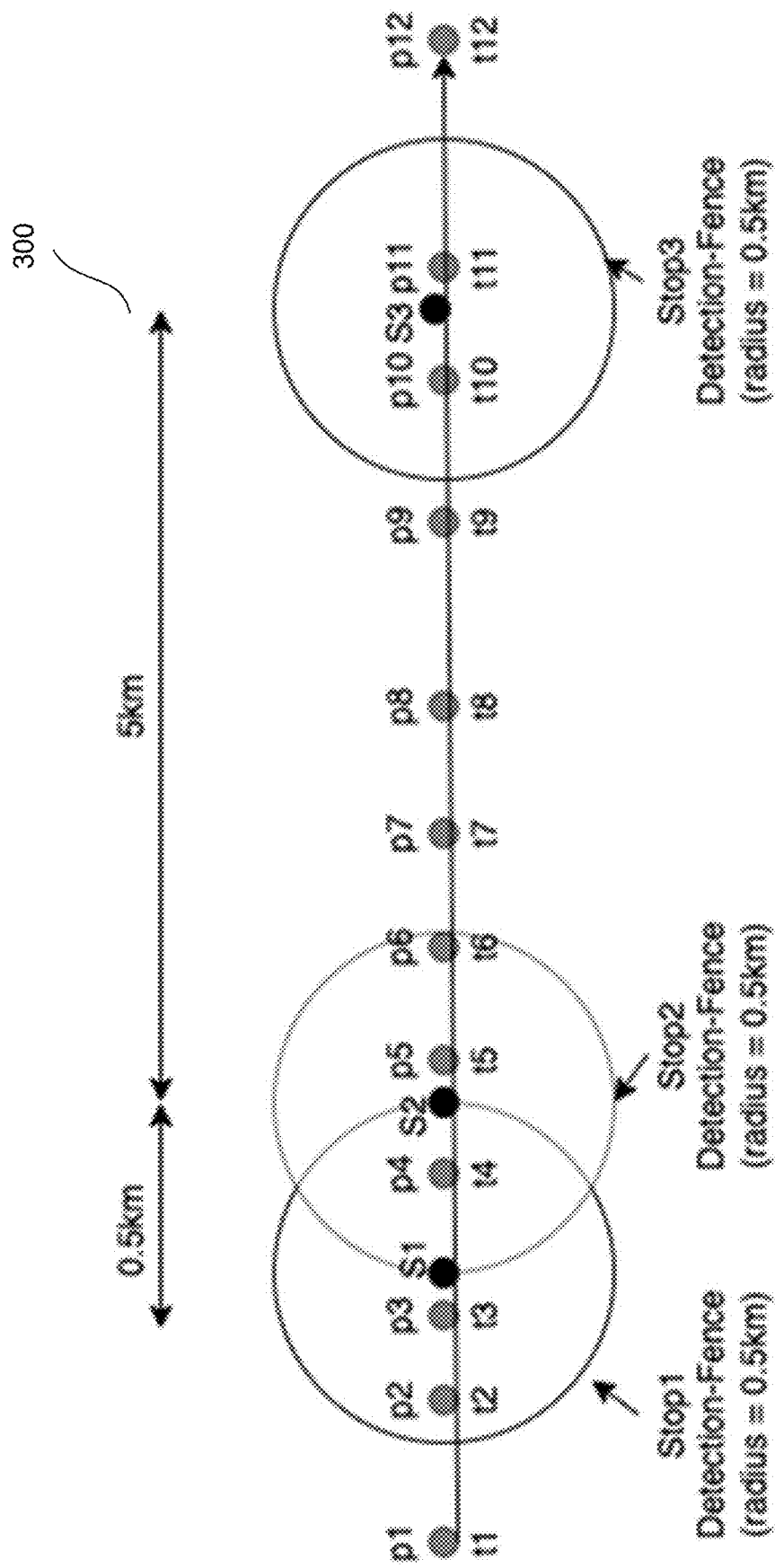
FIG. 3 illustrates a prior art determination of a stop radius for stops on a planned trip.

FIG. 3 illustrates a prior art determination of a stop radius for stops on a planned trip 300. In FIG. 3, trip 300 includes three planned stops, with the distance between Stop1 and Stop2 being 0.5 km and the distance between Stop2 and Stop3 being 5 km. The user defined stop detection fence radius is 0.5 km for all three stops For trip 300, since the stops Stop1 and Stop2 are in close vicinity, their detection fence radius overlap and as a result, the detected arrival and departure times of the stops would be inaccurate and lack precision and may even be missed.

Specifically, the arrival and departure times detected for trip 300 would be as follows:
Stop1=>arrivalTime=t2, departureTime=t5
Stop2=>arrivalTime=t5, departureTime=t7
Stop3=>arrivalTime=t10, departureTime=t12

The arrival time at Stop2 is delayed until there is a departure from Stop1, resulting in a delayed arrival detection at Stop2. Further, the departure time from Stop1 and arrival time at Stop2 lacks precision. These inaccuracies can lead to incorrect business inferences. For example, it is possible that the time required for the activity that was supposed to be carried out at Stop2 is accounted against Stop1. This results in inferring delays in carrying out activities at Stop1, because the duration at Stop1 is a sum of the time duration taken to carrying out activities at Stop1 and Stop2. This inaccuracy can also lead to erroneous inference of what happened at Stop2, and the duration captured could be brief and commensurate to the planned activity time at Stop2. Such inferences could have unwanted consequences to the businesses.

Figure 4:
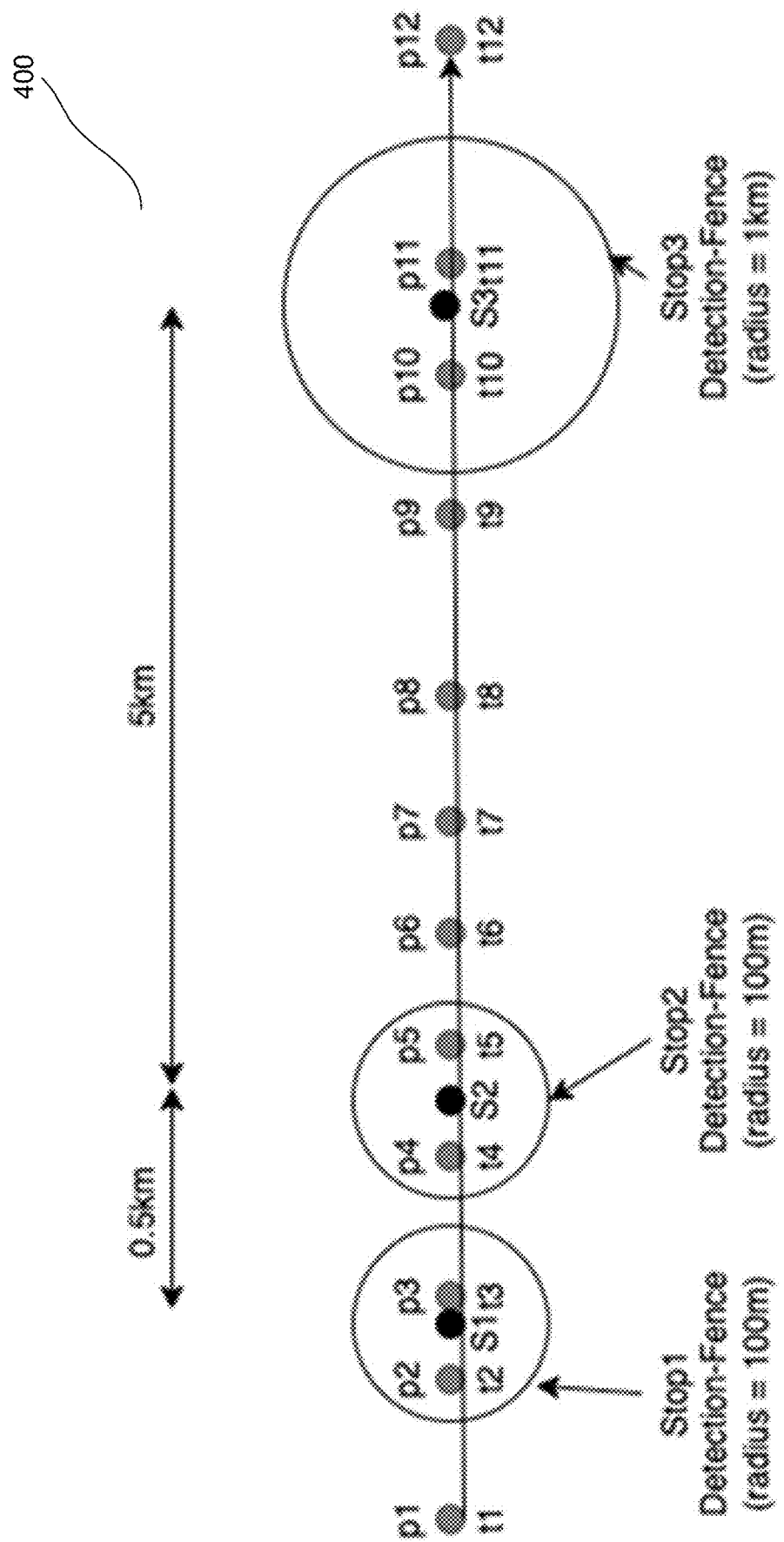
FIG. 4 illustrates a determination of an adaptive stop radius for stops on a planned trip in accordance to embodiments.

In contrast, embodiments determine an adaptive radius for one or more stops of a preplanned trip. FIG. 4 illustrates a determination of an adaptive stop radius for stops on a planned trip 400 in accordance to embodiments. The planned trip has specific pickup and drop off stops for specific inventory items. The planned trip also has a plan for sensor association with corresponding inventory items when and where applicable. Each stop has an address and hence a geo-position and a perimeter of a stop can be defined by a geofence (either radial or any other form). The trip plan can be created using a trip planning system, such as the trip planning system provided as part of the "IoT Fleet Monitoring Cloud" from Oracle Corp.

Embodiments include functionality that is included in a fleet monitoring system that monitors entities including trips, shipments, vehicles, equipment in vehicles, ship-orders, ship-units or packages, ship-items, and the drivers assigned to a trip. The "trip" is a collection of goods that is being transported, has been, or needs to be transported from one geographic location to another. The trip also encompasses the route defined for the movement of the goods.

Figure 5:
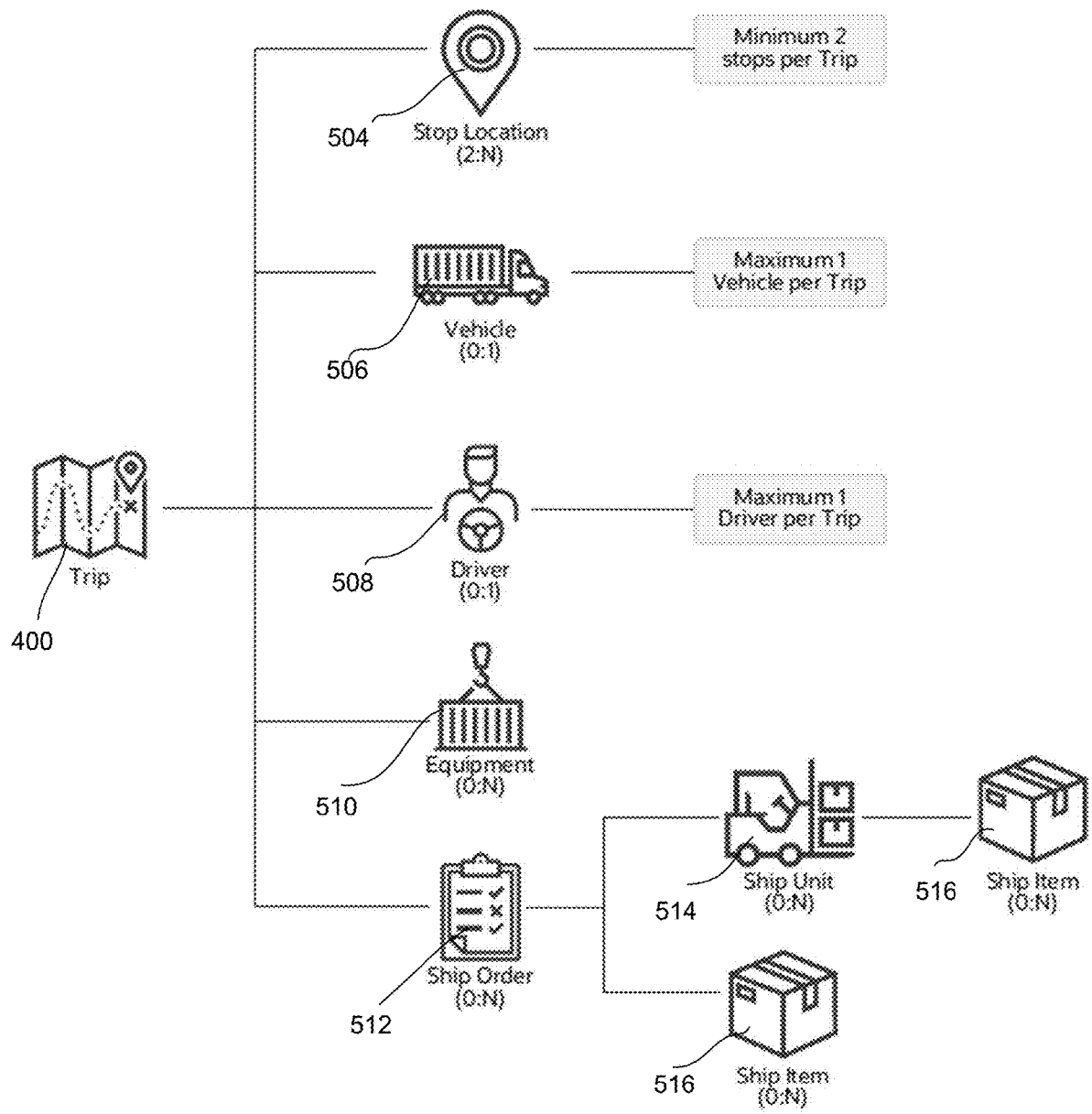
FIG. 5 illustrates the sub-entities that may form the planned trip in accordance to embodiments.

FIG. 5 illustrates the sub-entities that may form the planned trip 400 in accordance to embodiments. In addition to the start location and the final destination location, not shown, sub-entities include stop locations 504, which are the intermediate stops between the source and destination. They are either delivery points or pick up points. Sub-entities further includes a vehicle 506, which is a conveyance such as a truck or a car for transporting inventory from a source location to a stop location.

Sub-entities further includes a driver 508, which is the driver assigned to the trip. Sub-entities further includes equipment 510, which represents any method of storage or transport used for the movement of goods in a trip from one location to another, such as, a trailer, container, flatbed, or a tank, and so on. It can have sensors/trackers attached for measuring attributes including GPS, temperature, humidity, shock, tilt, pressure, and so on.

Sub-entities further include ship-orders 512, which are part of the inventory metadata that contains order information required for transportation of goods from one location to another in a trip. Sub-entities further includes ship-units 514 that are a transportation handling unit that is used to facilitate ease of transportation in a trip. These can be wooden or metallic pallets, boxes, cartons, automotive racks, and so on. A ship-order can contain one or more ship-units. Sub-entities further include ship-items 516 that are an individual trackable inventory item or items that is being transported and monitored in a trip. It can belong to a ship-unit 514 or can be independent of ship-units 424.

Each of the items and sub-items shown in FIG. 5 can be tracked using a corresponding sensor 101 (e.g., an IoT sensor) that transmits the location of the item, and other information if needed, at predetermined time intervals, in the form of messages. The messages are received by fleet management adaptive stop radius 10.

In determining the adaptive radius, the following input constraints are utilized in embodiments:
"csr": the Configured Stop detection Radius (the default value configured by the User) in km;
"Rd": the minimum threshold that can be used to improve the chances of stop detection;
"$D_{ij}$": the actual distance between stops "$S_i$" and "$S_j$";
"Rmin": the minimum threshold for the stop radius allow stop detection with tolerance to GPS inaccuracies;
"k": a multiplication factor, which is a fraction of $D_{ij}$.

The following variables are used in embodiments:
asr(Stop[i])=Actual Stop detection Radius of Stop[i];
distanceToNearestStop(S[i])=The minimum straight line distance from
Stop[i] to any other nearest stop=min(distance(Stop[i], Stop[j])), where j∈[1, n] and i≠j for a trip containing n stops Using the above, embodiments determine an adapted radius for each stop as follows ("equation 1"):

$$asr(S[i]) = \max(R\min, \min(\max(Rd, csr), k^* \text{distanceToNearestStop}(S[i])))$$

where:
0.1<=k<0.5
0.01<Rmin<0.05
0.25<=Rd<=1

Because equation 1 considers the minimum of the distances between stop i and the remaining other N−1 stops in the trip, it yields a result that is more appropriate to detect an accurate arrival and departure at stop i and its closest neighbor. If the distance between stops are large and greater than the configured stop radius, then equation 1 defaults to the configured value.

In embodiments, the default value for Rd is 0.5 km. This is because when the distance between stops are sufficiently large, the lower bound of the detection geofence radius is limited to Rd to cover a sufficiently large area. Since the frequency of receiving geo-coordinates from sensors 101 is not under the control of system 10, increasing the stop radius increases the chances of detection as there is now more area where a geo-location ping can be received.

In embodiments, the default value for Rmin is 0.025 km. This is the minimum stop detection radius that is chosen because the GPS accuracy is approximately 5 m to 10 m, and the limit to Rmin is used to provide for greater accuracy.

Figure 6:
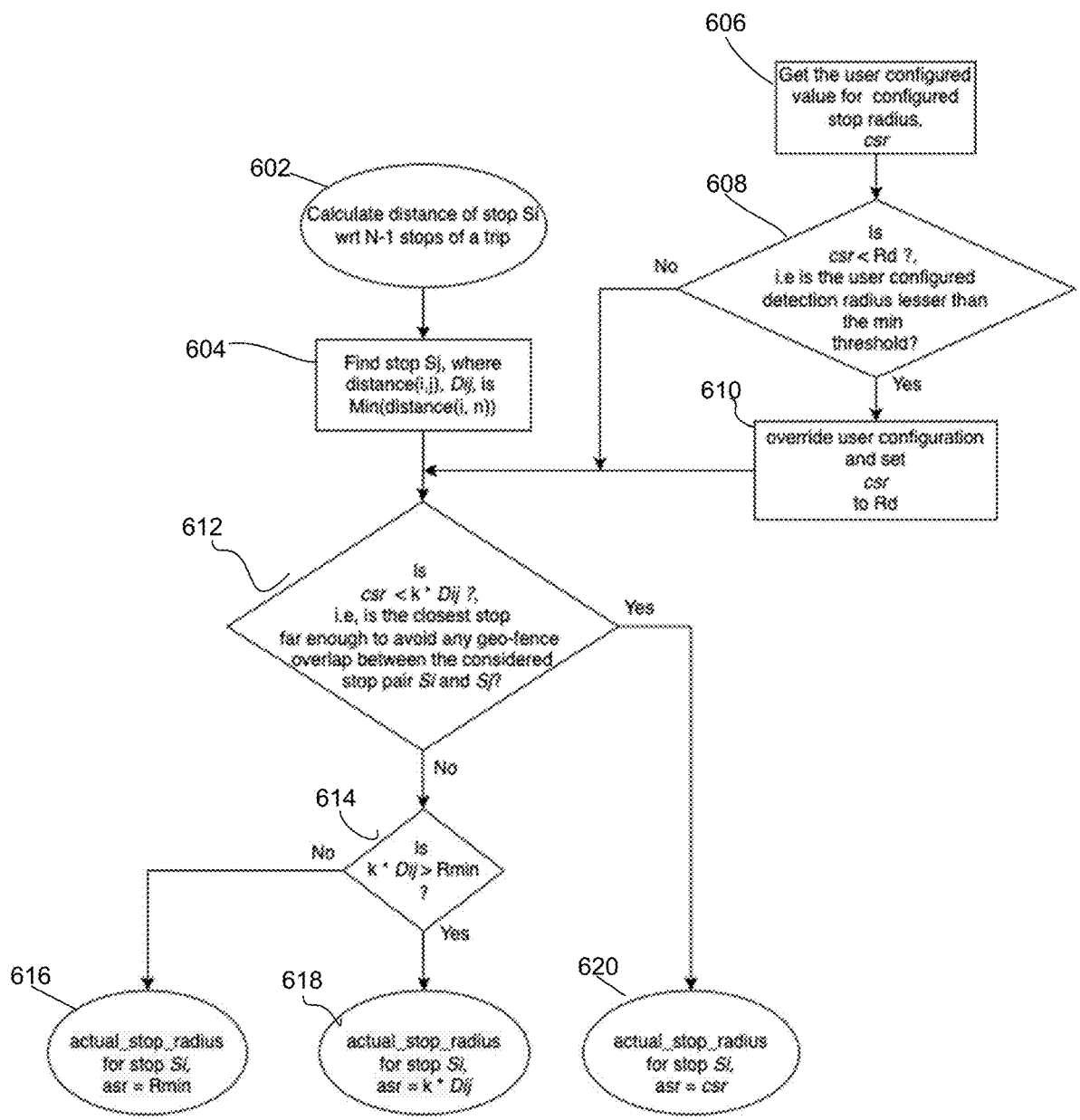
FIG. 6 is a flow diagram of the functionality of the fleet management adaptive stop radius of FIG. 1 when automatically adapting the geofence radius of each stop for a pre-planned trip in accordance to embodiments.

FIG. 6 is a flow diagram of the functionality of fleet management adaptive stop radius 10 of FIG. 1 when automatically adapting the geofence radius of each stop for a pre-planned trip in accordance to embodiments. In one embodiment, the functionality of FIG. 6 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The functionality of FIG. 6 causes the stop detection geo-fence radius to be adaptive. Instead of having a static stop detection radius for all the stops, or asking the user to perform an analysis and enter different stop radius for different stops, embodiments determine the stop detection radius of each stop based on the distance of the stop to the other nearest stop. In embodiments, the distance from a stop means the straight-line distance between the locations pointed to by the geo-coordinates of the stops.

The functionality of FIG. 6 begins with the created pre-planned trip 400 disclosed above, such as the simplified trip shown in FIG. 4. At 606 the csr in km to be used as a stop is received as input from the user or it can be a predefined input. The pre-defined inputs/constraints disclosed above of k, Rmin and Rd are also received.

At 602, the functionality is initiated to calculate a distance of stop $S_i$ with regard to the remaining N−1 stops of the preplanned trip 400, where N is the total number of stops.

At 604, the stop, $S_i$, is found where the distance $(i, j)$, $D_{ij}$, is Min(distance(i, n)).

At 608, it is determined if csr<Rd (i.e., is the user configured detection radius less than the minimum threshold). If yes at 608, at 610 the user configuration is overridden and csr is set to Rd. If no at 608, csr is used.

At 612, it is determined if csr<k*$D_{ij}$ (i.e., is the closest stop far enough to avoid any geofence overlap between the considered stop pair $S_i$ and $S_j$). If yes at 612, at 620 the asr for stop Si is the csr.

If no at 612, at 614 it is determined if k*$D_{ij}$>Rmin. If no at 614, at 616 the asr for stop Si is the Rmin. If yes at 614, at 618 the asr for stop Si is k*$D_{ij}$.

The following pseudocode implements the functionality of FIG. 6 in one embodiment:

For a trip with n stops
Compute distanceToNearest(Stop[i]) for each stop
Where distanceToNearest(Stop[i]) is the straight-line distance of Stop[i] from its nearest stop.

distanceToNearest(Stop[$i$])=min(distance(Stop[$i$],Stop[$j$])) where $j \in [1,n]$ and $i$ asr(Stop[$i$])=max($R$ min,min(max($Rd,csr$), $k$*distanceToNearestStop($S[i]$)))

Where
0.1<=k<0.5
0.01<Rmin<0.05
0.25<=Rd<=1
asr(Stop[i])→Actual stop radius of Stop[i]
csr→Configured stop radius (by the user)

Referring again to the example of FIG. 4 of trip 400 with three stops, the functionality of FIG. 6 is implemented using the default values of the constants disclosed above. The functionality proceeds as follows:

distance(Stop1, Stop2)=500 m (0.5 km)
distance(Stop2, Stop3)=5 km
distance(Stop1, Stop3)=5.5 km
csr=1 km distanceToNearestStop(Stop1)=min(distance(Stop1,Stop2),distance(Stop1,Stop3))=0.5 km distanceToNearestStop(Stop2)=min(distance(Stop2,Stop1),distance(Stop2,Stop3))=0.5 km distanceToNearestStop(Stop3)=min(distance(Stop3,Stop1),distance(Stop3,Stop2))=5 km asr(Stop1)=max(0.025,min(max(0.5,1),0.2*0.5))= max(0.025,min(1,0.1))=0.1 km=100 m asr(Stop2)=max(0.025,min(max(0.5,1),0.2*0.5))= max(0.025,min(1,0.1))=0.1 km=100 m asr(Stop3)=max(0.025,min(max(0.5,1),0.2*5.0))= max(0.025,min(1,1))=1 km As a result of the above functionality, the radius of Stop1 is 100 m, Stop2 is 100 m, and Stop3 is 1 km. This is in contrast to the example of FIG. 3 which uses the same route of the example of FIG. 4. The arrival and departure times detected in the example of FIG. 4 is as follows, which is more accurate than the results of FIG. 3 without an adaptive radius for each stop:

Stop1=>arrivalTime=t2, departureTime=t4
Stop2=>arrivalTime=t4, departureTime=t6
Stop3=>arrivalTime=t10, departureTime=t12

Sensor Gateway

In embodiments where there are a large number of IoT sensors 101, and/or some sensors are used for fleet monitoring as disclosed above, while other sensors are used for other types of functionality, a gateway between the sensors and the cloud (which can include fleet item linking/unlinking 10) is implemented. Examples of other types of functionality for sensors 101 include measurement of temperature, humidity, $CO_2$ levels, GPS, water level, water presence, electrical current/voltage, light, presence, etc. Small sensors or legacy devices can directly transmit their data to a nearby gateway instead of to the cloud, reducing their power consumption and increasing the sensors' battery life.

The gateway communicates with different types of sensors/devices using different protocols and then sends the data to a cloud service using a standard protocol. The gateway acts as a filter for the huge amount of data sent by the devices, processing the data and sending only relevant information to the cloud. Therefore, the processing and storage services is utilized optimally so that the need for processing and storage is reduced. Further, the response time for the sensors is considerably reduced. The nearby gateway receives the sensor data, processes it, and sends relevant commands back to the sensors. Further, gateways are highly secure and they also help secure the sensors and devices that are connected to them.

Figure 7:
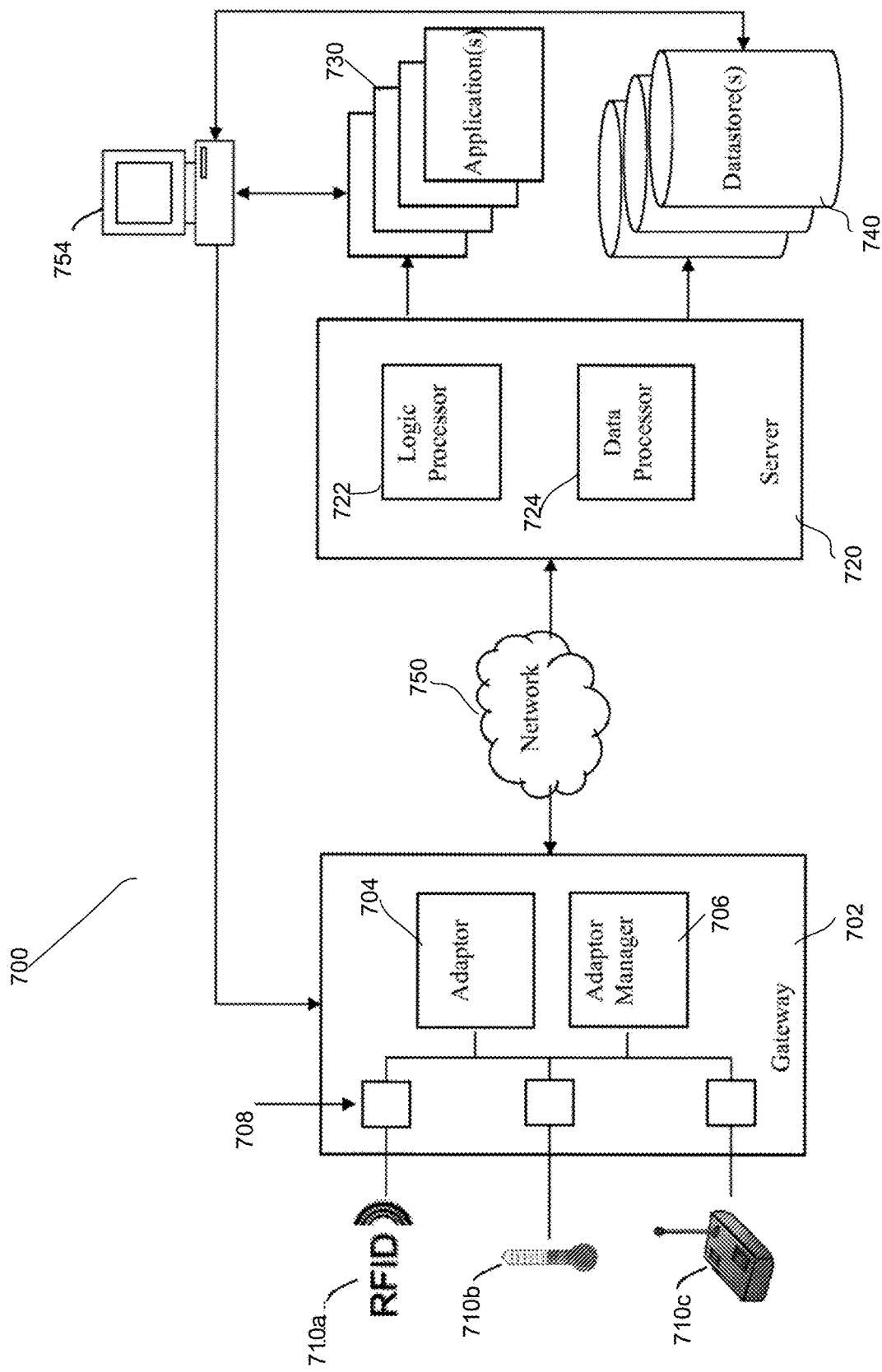
FIG. 7 is a block diagram of a gateway architecture in accordance to embodiments of the invention.

FIG. 7 is a block diagram of a gateway architecture 700 in accordance to embodiments of the invention. Architecture 700 permits effective integration between the systems in the operations technology portion and the systems in the information technology portion of the environment. Architecture 700 generally includes a gateway portion 702 having front-end data collection logic, and a server portion 720 to perform back-end processing of the collected data. To handle many different device/sensor types (including IoT sensors 101) and to provide the ability to handle high numbers of units being deployed in the field, embodiments provide a robust platform for handling issues such as: (a) sensor definition; (b) sensor management; (c) data capture; (d) data processing; (e) data transfer; (f) data storage; (g) analysis; and/or (h) visualizations. This architecture provides a framework for interfacing with any type of local device that may be deployed at a client site, and to allow data captured from those devices to be sent to a remote server, and to have the collected data be both locally and remotely programmatically processed. Gateway architecture 700, in general, can function as a sensor message receiving module that receives sensor messages.

Gateway 702 includes a sensor management module that handles the sensor code (e.g., that is implemented as custom code, such as Java code, specific to each sensor hardware). This module captures the sensor data in a generic way so that any type of data can be used. The gateway locally caches data so it can be pre-processed locally and no data is lost when there is no network connectivity. The data preprocessor performs actions such as data filtering using a set of rules. The system throttles the data so that data rates do not overwhelm the capabilities of the client gateway or the network. An internal data store may be included to store data in a platform-agnostic way. A data transfer module is employed to build the data for transmission. The system permits client gateways to talk to each other so as to establish a mesh network ensuring resiliency and connectedness.

In general, gateway 702 performs data acquisition and management of local devices 710a-c. The local devices 710a-c may include any type of equipment that can be suitably managed by architecture 700. For example, any number of sensors may be embedded within the local equipment at various sites. Examples of such sensors include RFID sensors at device 710a, temperature sensors at device 710b, and other types of smart devices, beacons, and/or machines at device 710c (including IoT sensors 101).

Local devices 710a-c can be configured to send data at regular intervals to gateway 702. Such data may include information to be captured from the local devices. For example, information that may be captured include operating conditions, metrics, pressure, vibration, temperature, and/or flow rate.

In additional to using sensor data for fleet management, as disclosed above, other examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

Gateway 702 includes an adaptor component 704 and an adaptor manager 706. Adaptor component 704 (also referred to herein as an "IoT adaptor") manages the gateway's interaction with local devices 710a-c, and may include device-specific code components 708 to perform its processing with local devices 710a-c. Adapter manager 706 (also referred to herein as an "IoT adaptor manager") is used to manage the operations, versioning, and/or provisioning of local devices 710a-c and adaptor component 704. In some embodiments, gateway 702 processes incoming data with local analytics (e.g., to analyze operating conditions and to identify fluctuations). To the extent necessary, alerts and data readings can be sent in real-time.

The data collected by gateway 702 are sent over a network 750 to server 720. Server 720 efficiently receives data from potentially a multitude of client gateways. The server module parses the data and caches it locally to expedite data capture. Pre-processing of the data may be performed for filtering, applying simple or complex script-based rules, etc. The data may be stored in an internal database. The persisted data can be forwarded to a corporate, generic table store. The server module may also take action based on the result of rules applied on the data, such as calling a web service, invoking further more complex rules, sending control data back to devices, etc. A generic table format can be used to store the sensor data within the enterprise application ecosystem. Keeping the relevant data within the ecosystem allows the use of standard tools in the enterprise application, such as reporting tools and form design tools. This means that users can use their pre-existing tools and systems to process the data from the operations technology ("OT") side, which allows the user to use systems which they are well-versed in using to report on and add intelligence to the data that is captured. An open interface (e.g., a RESTful interface) enables the captured data to be enquired and allows the development of rich, responsive, up-to-date client interfaces.

At server 720, a logic processor 722 (also referred to herein as an "IoT logic processor") and a data processor 724 (also referred to herein as an "IoT data processor") are provided to implement analysis and alert processing. These components may include operations technology and industry-specific rules and scripts.

Server 720 may communicate with one or more applications 730. Such applications 730 may include, for example, functionality to implement inventory management, quality management, condition-based maintenance, and/or provide a visualization portal, as well as functionality of FIG. 3 for determining inventory item linking and unlinking. Examples of these applications include, for example, Emergency Shutdown ("ESD") systems, Supervisor Control and Data Acquisition ("SCADA") systems, data analytics tools, BI ("business intelligence") tools, customer relationship management ("CRM") products, enterprise resource planning ("ERP") products, enterprise marketing products, financials applications, and/or procurement applications. The application products are hosted on computing hardware operated by the cloud provider.

Server 720 may also manage the storage of the collected data into one or more datastores 740. Datastore 740 includes any combination of hardware and software that allows for ready access to the data that is located at a computer readable storage device. For example, datastore 740 could be implemented as computer memory operatively managed by an operating system. The data in datastore 740 could also be implemented as database objects and/or files in a file system.

One or more users may exist at one or more user stations 754 that interact with the architecture 700. User station 754 includes any type of computing station that may be used to operate or interface with architecture 700. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 700, such as a mouse or keyboard to manipulate a pointing object in a graphical user interface to generate user inputs.

Either server 720 or the user at user station 754 may provide control signals to gateway 702 to control the operation of the gateway 702 and/or the local devices 710*a-c*. The control signals may be used to control any operation necessary at the gateway and/or local device 710*a-c*, including for example, to update and provision control software on the gateway and/or to control operation of the local device. Further details of the functionality of architecture 700, which can be used in conjunction with fleet item linking/unlinking network/system 150 of FIG. 1, is disclosed in U.S. Pat. No. 10,382,294.

In embodiments, the generated sensor messages are generated as a specialized data structure that includes attributes of sensors, vehicles, etc. In embodiments, the specialized data structure is in the form of an electronic document (e.g., an XML document) and is stored in database 17. A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

As disclosed, embodiments generate an adaptive radius for each stop detection geofence to ensure that when trips have stops in close vicinity and the detection fences will not overlap. As a result, a fleet management system will provide a more accurate detection of arrival and departure at the stops.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of detecting stops by an entity on a pre-planned trip comprising a plurality of stops and a planned sequence of the stops, the method comprising:
   for each stop of the plurality of stops, determining a distance to a nearest stop;
   generating a corresponding geofence for each of the stops, each geofence comprising a radius, the generating automatically determining a size of the radius based on the distance to the corresponding nearest stop;
   detecting the entity entering one of the geofences in response to receiving a geo-location message corresponding to the entity indicating a corresponding location and corresponding time for the entity;
   based on the detecting the entity entering one of the geofences, determining that the entity has stopped at a corresponding stop.

2. The method of claim 1, wherein the entity is associated with an Internet of Things (IoT) device that provides the geo-location, and the geo-location message is received via a gateway sensor that is configured to communicate with a plurality of IoT devices having different protocols and converting the different protocols to a standard protocol.

3. The method of claim 1, further comprising:
   detecting the entity exiting one of the geofences;
   based on the detecting the entity exiting one of the geofences, determining that the entity has exited the corresponding stop.

4. The method of claim 1, wherein a first stop of the plurality of stops has a geofence radius of a first size and a second stop of the plurality of stops has a geofence radius of a second size that is different than the first size.

5. The method of claim 1, wherein the radius (asr(S[i])) for each geofence corresponding to a stop (StopS[i]) comprises:

asr(S[i])=max(Rmin, min(max(Rd, csr), k*distanceToNearestStop(S[i])))
   where:
   $0.1 \leq k < 0.5$;
   $0.01 < Rmin < 0.05$;
   $0.25 \leq Rd \leq 1$;
   and csr comprises a configured stop detection radius of a Stop(S[i]).

6. The method of claim 1, wherein none of the geofences overlap.

7. The method of claim 1, wherein the entity comprises a vehicle and the pre-planned trip comprises a trip plan comprising, for the vehicle, a start location, an end location, and the plurality of stops.

8. A non-transitory computer-readable medium having instructions stored thereon that, when executed by one or more processors, cause the processors to detect stops by an entity on a pre-planned trip comprising a plurality of stops and a planned sequence of the stops, the detecting stops comprising:
   for each stop of the plurality of stops, determining a distance to a nearest stop;
   generating a corresponding geofence for each of the stops, each geofence comprising a radius, the generating automatically determining a size of the radius based on the distance to the corresponding nearest stop;
   detecting the entity entering one of the geofences in response to receiving a geo-location message corresponding to the entity indicating a corresponding location and corresponding time for the entity;
   based on the detecting the entity entering one of the geofences, determining that the entity has stopped at a corresponding stop.

9. The computer-readable medium of claim 8, wherein the entity is associated with an Internet of Things (IoT) device that provides the geo-location, and the geo-location message is received via a gateway sensor that is configured to communicate with a plurality of IoT devices having different protocols and converting the different protocols to a standard protocol.

10. The computer-readable medium of claim 8, the detecting stops further comprising:
    detecting the entity exiting one of the geofences;
    based on the detecting the entity exiting one of the geofences, determining that the entity has exited the corresponding stop.

11. The computer-readable medium of claim 8, wherein a first stop of the plurality of stops has a geofence radius of a first size and a second stop of the plurality of stops has a geofence radius of a second size that is different than the first size.

12. The computer-readable medium of claim 8, wherein the radius (asr(S[i])) for each geofence corresponding to a stop (StopS[i]) comprises:
    asr(S[i])=max(Rmin, min(max(Rd, csr), k*distanceToNearestStop(S[i])))
    where:
    0.1<=k<0.5;
    0.01<Rmin<0.05;
    0.25<=Rd<=1;
    and csr comprises a configured stop detection radius of a Stop(S[i]).

13. The computer-readable medium of claim 8, wherein none of the geofences overlap.

14. The computer-readable medium of claim 8, wherein the entity comprises a vehicle and the pre-planned trip comprises a trip plan comprising, for the vehicle, a start location, an end location, and the plurality of stops.

15. A fleet monitoring system for detecting stops by an entity on a pre-planned trip comprising a plurality of stops and a planned sequence of the stops, the system comprising:
    a sensor message receiving module;
    one or more processors that execute instructions to, in response to receiving sensor messages from the message receiving module:
        for each stop of the plurality of stops, determining a distance to a nearest stop;
        generating a corresponding geofence for each of the stops, each geofence comprising a radius, the generating automatically determining a size of the radius based on the distance to the corresponding nearest stop;
        detecting the entity entering one of the geofences in response to receiving a geo-location message corresponding to the entity indicating a corresponding location and corresponding time for the entity;
        based on the detecting the entity entering one of the geofences, determining that the entity has stopped at a corresponding stop.

16. The system of claim 15, wherein the entity is associated with an Internet of Things (IoT) device that provides the geo-location, and the geo-location message is received via a gateway sensor that is configured to communicate with a plurality of IoT devices having different protocols and converting the different protocols to a standard protocol.

17. The system of claim 15, the message receiving module further comprising:
    detecting the entity exiting one of the geofences;
    based on the detecting the entity exiting one of the geofences, determining that the entity has exited the corresponding stop.

18. The system of claim 15, wherein a first stop of the plurality of stops has a geofence radius of a first size and a second stop of the plurality of stops has a geofence radius of a second size that is different than the first size.

19. The system of claim 15, wherein the radius (asr(S[i])) for each geofence corresponding to a stop (StopS[i]) comprises:
    asr(S[i])=max(Rmin, min(max(Rd, csr), k*distanceToNearestStop(S[i])))
    where:
    0.1<=k<0.5;
    0.01<Rmin<0.05;
    0.25<=Rd<=1;
    and csr comprises a configured stop detection radius of a Stop(S[i]).

20. The system of claim 15, wherein none of the geofences overlap.

\* \* \* \* \*